Nov. 28, 1967     R. F. GARDINER     3,355,658
DIFFERENTIATING METAL DETECTOR FOR DETECTING METAL OBJECTS AND
DISTINGUISHING BETWEEN DETECTED DIAMAGNETIC AND
NON-DIAMAGNETIC OBJECTS
Filed Dec. 6, 1965
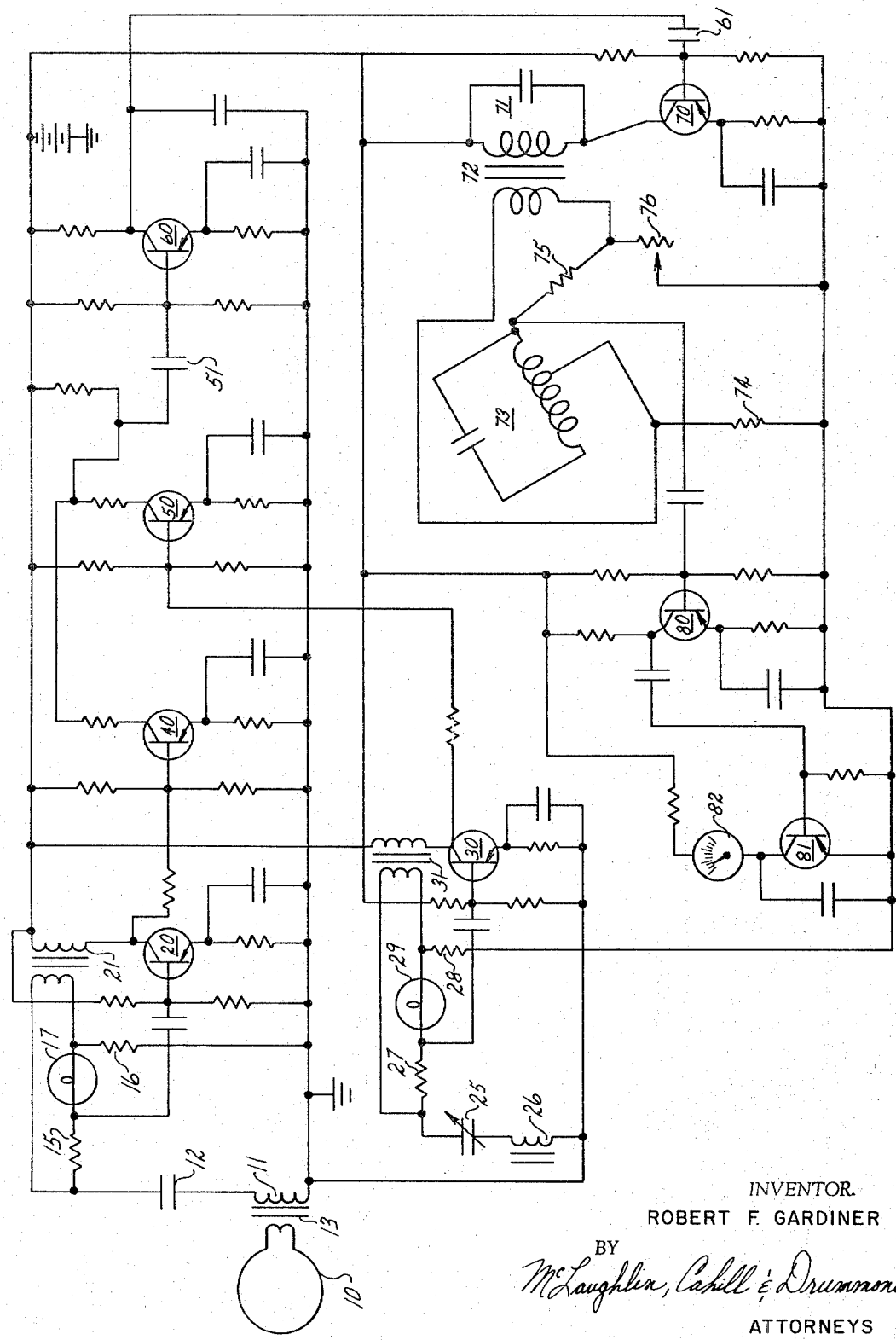
INVENTOR.
ROBERT F. GARDINER
BY
McLaughlin, Cahill & Drummond
ATTORNEYS

3,355,658
DIFFERENTIATING METAL DETECTOR FOR DETECTING METAL OBJECTS AND DISTINGUISHING BETWEEN DETECTED DIAMAGNETIC AND NON-DIAMAGNETIC OBJECTS
Robert F. Gardiner, 4729 N. 7th Ave., Phoenix, Ariz. 85013
Filed Dec. 6, 1965, Ser. No. 512,595
4 Claims. (Cl. 324—3)

ABSTRACT OF THE DISCLOSURE

A pair of oscillators utilizing series resonant tank circuits tuned to oscillate at less than 15,000 cycles per second and tuned to frequencies different from each other; one tank circuit is coupled to a search coil and both oscillators are connected to a mixer for developing a difference frequency indicative of the presence and type of detected object.

---

The present invention pertains to metal detectors, and more specifically, to a unique circuit for providing a means to distinguish between ferrous and non-ferrous metals.

The generation of a magnetic field for the detection of metals is well known; the utilization of a portable device having a coil for generating the magnetic field is also well known in the art. In those instances where attempts have been made to provide a metal detector for differentiating between non-ferrous and ferrous metals, the detectors have become exceedingly cumbersome, expensive, complicated, and very unreliable. The dissatisfaction with prior art metal detectors usually stems from one of two principal difficulties. The first is the inability of the detector to accurately distinguish between ferromagnetic metals, paramagnetic materials, and diamagnetic substances. The inability to distinguish diamagnetic substances from other metals results from the required utilization of high frequencies. The eddy currents induced by high frequencies result in a loss in the detected metal that shrouds the phenomena enabling the distinction between diamagnetic and non-diamagnetic metals, viz, magnetic susceptibility. The higher frequencies induce such eddy current losses that the permeability change in the magnetic circuit including the detection coil is overshadowed by the high $i^2R$ loss in the metal. To reduce the eddy current losses attributable to the higher frequencies, prior art detectors have attempted to use low frequencies and thereby encountered the second major area of difficulty.

To obtain stable generation of frequencies enabling the distinction between diamagnetic and non-diamagnetic metals, the prior art resorted to exceedingly complicated circuitry and apparatus. The complication involved by the prior art reduced reliability and increased the power requirements to the extent that portable power supplies to supply the required magnitude of power became infeasible. Adjusting the oscillators for stable operation became a problem so insurmountable as to have caused the prior art to abandon attempts to provide a low frequency detector and resort to high frequency (in the range of 100 kilocycles to 2 megacycles).

It is therefore an object of the present invention to provide an improved metal detector capable of distinguishing between diamagnetic and nondiamagnetic metals.

It is still another object of the present invention to provide a metal detector utilizing oscillators operating in a frequency range of less than 15,000 cycles per second.

It is a further object of the present invention to provide a metal detector constructed of readily available components to provide a stable, reliable and high performance metal detector.

Briefly, in accordance with one embodiment of the present invention, a pair of oscillators are provided each having a series resonant tank circuit tuned to oscillate at less than 15,000 cycles per second and at a frequency different from each other. A search coil is coupled to the resonant tank of one of the oscillators and the two oscillators are then adjusted to provide a predetermined difference frequency. The difference frequency is derived through the utilization of a mixer connected to each of the oscillators, the output of which is amplified and supplied to a frequency sensitive amplifier. The frequency-sensitive amplifier is also tuned to the predetermined difference frequency; the output of the amplifier is applied to a frequency-sensitive bridge circuit (also tuned to the predetermined difference frequency). The output of the bridge circuit is amplified and supplied to an indicator such as a meter to indicate the amplitude of the signal being supplied by the tuned amplifier and tuned bridge. The detection of a metal by the search coil will change the frequency of oscillation of the oscillator to which it is connected such that the frequency difference between the two oscillators will be changed and the deviation from the existing difference frequency from the predetermined difference frequency will result in a change in the amplitude of signal provided by the tuned amplifier and tuned bridge circuit and consequently a change in the meter indication.

The present invention may more completely be described by reference to the accompanying drawing which shows a schematic circiut diagram of a metal detector constructed in accordance with the teachings of the present invention.

Referring to the figure, a search coil 10 is shown inductively coupled to a series resonant circuit including inductance 11 and capacitor 12. The search coil may take a variety of forms but it has been found that an air coil suitable for locating objects beneath the surface of the ground may readily be constructed using one turn of ⅜ inch aluminum tubing formed into a circle of approximately three feet in diameter. The one turn "coil" may be mounted on some non-magnetic supporting apparatus, such as wood, for convenient attachment of a handle to hold the coil above the ground. The inductive coupling from the one turn search coil 10 into the series resonant circuit 11 and 12 may be accomplished through the utilization of a transformer 13 having a turns ratio of 1 to 100. It will be obvious to those skilled in the art that a variety of turns ratios and specific physical arrangements may be used to couple the search coil 10 into the circuit. The series resonant circuit including inductance 11 and capacitor 12 forms one arm of a four-arm bridge. Resistances 15, 16 and 17 form the remaining three arms of the bridge. The resistance 17 may take the form of a lamp filament to thereby act as a limiter to limit the amplitude of oscillation. The bridge is connected to the base electrode of transistor 20 which includes a feedback transformer 21 connected in the collector circuit thereof. The oscillator is tuned to a frequency of less than 15,000 cycles per second. It has been found that a frequency in the range of 750 to 1500 cycles per second is optimum but that the system will function properly at frequencies up to 15,000 cycles per second. A fixed oscillator is also provided including a series resonant arm having variable capacitor 25 and inductance 26 therein. The series resonant arm together with resistances 27, 28 and 29 form a bridge similar to the bridge discussed in connection with the first oscillator. The bridge is connected to transistor 30 having a feedback transformer 31 in the collector circuit thereof. The bridge-type oscillator including transistor 30 is tuned to oscillate at a frequency less than 15,000 cycles per second and at a frequency approximately 40 cycles greater than the oscillator including transistor 20. The choice of the 40 cycles per second difference between the oscillating frequencies of the two oscillators may be varied; the particular choice of 40 cycles per second having been found to operate satisfactorily. The output of the oscillator including the transistor 20 is provided to a amplifier-buffer-mixer including transistor 40 having its base electrode connected to the collector electrode of transistor 20. The transistor 40, and associated circuitry, serve to buffer or isolate the oscillator from the remainder of the system while providing an amplifying function and operating as part of a mixer. The oscillator including transistor 30 is connected to a similar amplifier-buffer-mixer including transistor 50 which performs the same function as transistor 40. The output of transistor 40 and transistor 50 are combined to yield a beat frequency equal to the predetermined difference frequency between the frequencies of oscillations of the oscillators. The beat frequency is coupled through capacitor 51 to the base electrode of a transistor 60. The transistor 60 acts as a detector amplifier which amplifies the beat frequency and couples the amplified signal through capacitor 61 to the base electrode of transistor 70. The transistor 70, with its associated circuitry, forms a tuned amplifier which is tuned to the predetermined difference frequency (40 cycles per second in the embodiment chosen for illustration). The collector electrode of the transistor 70 is connected to a tank circuit 71 which is frequency selected as described above.

The output of the tuned amplifier is taken from the amplifier through transformer 72 and is applied to a tuned bridge. The bridge comprises tuned circuit 73 as one arm and resistances 74, 75, and 76 as the remaining arms. The bridge provides a null output when the input frequency is equal to the frequency for which it was designed (40 cycles). Resistor 76 may be adjusted to balance the bridge to its optimum (null) output. The output of the bridge circuit is applied to a conventional two-stage amplifier including transistors 80 and 81, the latter having a meter 82 in the collector circuit thereof. The tuned bridge is, as mentioned previously, tuned to the predetermined difference frequency. Any deviation from the predetermined difference frequency applied to the bridge results in a substantial increase in the amplitude of the output signal. Thus, the tuned bridge renders the system exceedingly sensitive to slight changes in frequency differences between the oscillators. The meter 82 may readily be replaced by an audio system including head phones or by a recording meter. It has been found that for practical field use, the meter or head phones are best.

The operation of the circuit of the figure may be described as follows. With the device in its normal operating condition (no metal being detected), the oscillator connected to the search coil is oscillating typically at a frequency of 1,000 cycles per second; the second oscillator is oscillating at approximately 1,040 cycles per second. The resulting predetermined difference frequency of 40 cycles per second is applied to the amplifier-buffer-mixer transistors 40 and 50, the outputs of which are applied through capacitor 51 to the transistor 60. The resulting "beat frequency" equal to the predetermined difference frequency is amplified by the tuned amplifier 70 and applied to the tuned bridge. The tuned bridge has been tuned to a frequency of 40 cycles per second and since the frequency of the signal being applied to the bridge is 40 cycles per second, a "null" is achieved and the bridge provides no output to the amplifying transistors 80 and 81. The variable capacitor 25 of the second oscillator may then be adjusted to provide a predetermined difference frequency slightly less than the frequency to which the bridge has been tuned. The predetermined difference frequency may then be adjusted to provide an output from the tuned bridge to the amplifying transistors 80 and 81 and ultimately resulting in a meter deflection. The predetermined difference frequency will be adjusted until the meter is approximately half scale. The system is then ready to be used to detect metallic objects. As the search coil 10 is passed over the surface of the ground, the alternating magnetic field generated thereby pierces the surface of the ground and, upon detection of a diamagnetic material such as gold or silver, the frequency of oscillation of the first oscillator will increase. The increase in the oscillating frequency of the oscillator including transistor 20 will result in a difference frequency that is less than the previously adjusted predetermined difference frequency. This new difference frequency will be applied through the mixer transistors, the detector amplifier, tuned amplifier to the tuned bridge. Since the frequency now being applied to the tuned bridge is less than the frequency previously applied to the bridge and is also further from the 40 cycles per second to which the bridge is tuned, the output from the bridge will increase and the reading of the meter will increase. If the metal being detected is a non-diamagnetic metal such as iron, the frequency of the oscillator including the search coil will go down and the difference frequency will become larger. As a result, the amplitude of the signal provided by the tuned bridge will decrease since the applied frequency will approach more closely 40 cycles per second. The meter reading will decrease thus indicating that the object detected is a non-diamagnetic material. In this manner, the metal detector may be used to detect the presence of metal objects and may also be utilized to differentiate between diamagnetic and non-diamagnetic materials by observing the direction of the meter deflection. It will be obvious that the direction of meter deflection will vary in accordance with the oscillating frequencies of the two oscillators; for example, if the oscillator including the transistor 30 were made to oscillate at a higher frequency than the oscillator including the search coil 10, the meter deflection would have an opposite sense. Further, while the oscillator including transistor 30 is shown as being adjustable by adjusting the resonance of the series tank via variable capacitor 25, several other methods for changing the frequency of oscillation are equally applicable.

All of the electronic components utilized in the system of the present invention are readily available; further, the relatively few electronic elements of the system of the present invention result in high performance and reliable metal detection. It will be obvious to those skilled in the art that many modifications may be made from these specific embodiments chosen for illustration. It is therefore intended that the present invention be limited only by the scope of the claims appended hereto.

I claim:

1. A metal detector comprising: a first and a second oscillator, each having a series resonant tank circuit tuned to oscillate at less than 15,000 cycles per second and at a frequency different from each other; a mixer connected to said oscillators for deriving a difference frequency equal to the difference between the frequencies of oscillation of said oscillators; a tuned amplifier connected to said mixer, said tuned amplifier including a tank circuit tuned to a predetermined difference frequency for providing an output signal having an amplitude proportional to the deviation of said difference frequency from said predetermined difference frequency; indicating means connected to said tuned amplifier for indicating the amplitude of said output signal; and a search coil coupled to the series resonant tank circuit of said first oscillator.

2. A metal detector comprising: a first oscillator tuned to oscillate at a frequency less than 15,000 cycles per second, said oscillator including a bridge having a series resonant arm and three resistance arms, one of said resistance arms being a lamp filament; a second oscillator tuned to oscillate at a frequency of less than 15,000 cycles per second and at a frequency different from the frequency of said first oscillator; a mixer connected to said oscillators for deriving a difference frequency equal to the difference between the frequencies of oscillation of said oscillators;

a tuned amplifier connected to said mixer, said tuned amplifier including a tank circuit tuned to a predetermined difference frequency for providing an output signal having an amplitude proportional to the deviation of said difference frequency from said predetermined difference frequency; indicating means connected to said tuned amplifier for indicating the amplitude of said output signal; and a search coil coupled to the series resonant arm of the bridge of said first oscillator.

3. A metal detector comprising: a first and a second oscillator, each having a series resonant tank circuit tuned to oscillate at less than 15,000 cycles per second and at a frequency different from each other; a mixer connected to said oscillators for deriving a difference frequency equal to the difference between the frequencies of oscillation of said oscillators; a tuned amplifier connected to said mixer, said tuned amplifier including a tank circuit tuned to a predetermined difference frequency for providing an output signal having an amplitude proportional to the deviation of said difference frequency from said predetermined difference frequency; a tuned bridge connected to said tuned amplifier; indicating means connected to said tuned bridge for indicating the amplitude of said output signal; and a search coil coupled to the series resonant tank circuit of said first oscillator.

4. A metal detector comprising: a first oscillator tuned to oscillate at a frequency less than 15,000 cycles per second, said oscillator including a bridge having a series resonant arm and three resistance arms, one of said resistance arms being a lamp filament; a second oscillator tuned to oscillate at a frequency of less than 15,000 cycles per second and at a frequency different from the frequency of said first oscillator; a mixer connected to said oscillators for deriving a difference frequency equal to the difference between the frequencies of oscillation of said oscillators; a tuned amplifier connected to said mixer, said tuned amplifier including a tank circuit tuned to a predetermined difference frequency for providing an output signal having an amplitude proportional to the deviation of said difference frequency from said predetermined difference frequency; a tuned bridge connected to said tuned amplifier; indicating means connected to said tuned bridge for indicating the amplitude of said output signal; and a search coil coupled to the series resonant arm of the bridge of said first oscillator.

References Cited

UNITED STATES PATENTS

| | | | |
|---|---|---|---|
| 2,393,717 | 1/1946 | Speaker | 324—3 X |
| 2,442,805 | 6/1948 | Gilson | 324—3 X |
| 2,447,316 | 8/1948 | Curtis | 324—3 X |
| 2,483,311 | 9/1949 | Blok | 324—79 |
| 2,617,938 | 11/1952 | Haner | 324—79 X |
| 3,031,627 | 4/1962 | Reichert et al. | 331—110 |
| 3,157,841 | 11/1964 | Gilbert | 331—110 |

OTHER REFERENCES

Osborne: Transistorized Metal Locator, Electronics World, March 1962, pp. 86–88.

RUDOLPH V. ROLINEC, *Primary Examiner.*

W. CARLSON, *Examiner.*

G. STRECKER, *Assistant Examiner.*